United States Patent Office 2,709,136
Patented May 24, 1955

2,709,136

PHOTOGRAPHIC PROCESS

Karl Otto Ganguin and Eric Macdonald, Blackley, Manchester, England, assignors to Imperial Chemical Industries Limited, a corporation of Great Britain No Drawing. Application June 4, 1951,
Serial No. 229,863

6 Claims. (Cl. 95—88)

This invention relates to a photographic process and more particularly to an improved process for discharging filter dyestuffs in photographic materials, especially in colour photographic materials.

In colour photographic processes wherein there are employed differently sensitised layers mounted on a film base or paper, and wherein the uppermost layer is employed for forming the blue record, it is necessary to have a yellow filter layer between the uppermost layer and the other sensitive layers so that any blue light which passes through the uppermost layer will not strike the lower sensitive layers, which in addition to being sensitised to particular parts of the spectrum, are also sensitive to blue light. For this yellow filter layer it has been a common practice to use a gelatin layer containing colloidal silver, but this practice has many disadvantages. The manufacture of the colloidal silver dispersion with the required light absorption characteristics is expensive and requires much time and skill, and the finished dispersion can only be stored satisfactorily in a refrigerated store. Furthermore the dispersed silver gives rise to fogging at the boundaries between the filter layer and the sensitive layers, so that for some purposes it may be necessary to coat a separation layer on each side of the filter layer. In optical characteristics also, colloidal silver is not ideal, since the overall black content of the colloidal silver layer diminishes the effective speed of the lower sensitive layers.

It has already been proposed to use a yellow dyestuff in place of colloidal silver in a filter layer, but hitherto no satisfactory method has been devised for the complete and irreversible discharge of the dyestuff after exposure and colour development of the photographic material. Some discharge can be obtained by treatment with, for example, sodium sulphite, but when the treated photographic material is further processed or washed, the dyestuff is at least partially re-formed.

The difficulty of discharging yellow filter dyestuffs is especially great when the dyestuffs are of the non-diffusible class, that is to say when for example they carry in their molecular structure a substituent, such as for example a long alkyl chain, which renders the dyestuff non-diffusible in gelatin, or when they have been precipitated by a precipitating agent of large molecular size, or when they have been rendered non-diffusible by dissolving them in a water-insoluble, water-permeable resin which is then dispersed in for example, gelatin, by a method similar to that used for colour formers.

If a yellow dyestuff is to be used, it is desirable to use a non-diffusible dyestuff, since such a dyestuff does not diffuse into adjacent layers of the photographic material so that by the use of a non-diffusible dyestuff, harmful contamination of the sensitive layers can be avoided without the need for separation layers on each side of the filter layer.

We have now found that when certain yellow non-diffusible dyestuffs are used in filter layers in photographic materials, and the photographic material, after exposure and processing in the usual manner is treated with an amino compound as hereinafter defined, the dyestuff is completely and irreversibly discharged.

The dyestuffs used are the non-diffusible styryl dyestuffs which carry a substituent which renders the dyestuff non-diffusible, for example a substituent containing an alkyl chain of at least 5 carbon atoms or which have been rendered non-diffusible by one of the other methods indicated above and which are obtainable by condensing an anil of a substituted benzaldehyde with a reactive methylene compound.

The amino compounds used for discharging the dyestuffs are compounds of the formula R—NH$_2$ wherein R stands for alkyl-, aralkyl-, amino-, alkylamino-, aralkylamino-, arylamino-, aminoalkylene- or -hydroxyl. That is to say the compounds are, alkylamines, aralkylamines, hydrazine, alkylhydrazines, aralkylhydrazines, arylhydrazines, alkylene diamines and hydroxylamine.

According to our invention therefore, we provide an improved process for colour photography wherein a photographic material containing dischargeable yellow filter is used which comprises using a non-diffusible styryl dyestuff in at least one filter layer of the photographic material and treating the photographic material after exposure and development with an aqueous solution of an amino compound as hereinbefore defined.

According to a preferred feature of our invention, the solution of the amino compound contains also a surface active agent.

As said the non-diffusible styryl dyestuffs may be made by condensing with an anil of a substituted benzaldehyde, a reactive methylene compound. A benzaldehyde substituted with solubilising groups is preferably used.

As suitable substituted benzaldehydes there may be mentioned 2:4-dimethoxybenzaldehyde, p-methylaminobenzaldehyde, p-ethylaminobenzaldehyde, p-methylethylaminobenzaldehyde, p-dimethylaminobenzaldehyde, p-diethylaminobenzaldehyde, p-dipropylaminobenzaldehyde, p-(N-methyl-N-β-hydroxyethylamino)-benzaldehyde, p-(N-ethyl-N-β-hydroxyethylamino)-benzaldehyde, p-(β:β'-dihydroxydiethylamino)-benzaldehyde, p-(N-methyl-N-methoxyethylamino)-benzaldehyde, p-(N-ethyl-N-methoxyethylamino)-benzaldehyde, p-(N-butyl-N-β-hydroxyethylamino)-benzaldehyde, p-(N-methyl-N-β-chloroethylamino)-benzaldehyde, p-(N-ethyl-N-β-chloroethylamino)-benzaldehyde, p-(β:β'-dichlorodiethylamino)-benzaldehyde, 4-(β:β'-dichlorodiethylamino)-2-methylbenzaldehyde, p-(N-methyl-N-β-cyanoethylamino)-benzaldehyde, p-(β:β'-dicyanodiethylamino)-benzaldehyde, p-(N-methyl-N-β-carboxyethylamino)-benzaldehyde, p-di-(carboxymethyl)-amino-benzaldehyde, and the corresponding diethyl ester, p-(β:β'-dicarboxydiethylamino)-benzaldehyde, p-(N-methyl-N-β-sulphoethylamino)-benzaldehyde, 4-(β:β'-disulphodiethylamino)-2-methyl-benzaldehyde.

The N-cyanoalkyl or N-dicyanodialkyl substituted p-aminobenzaldehydes may be made by treating the corresponding hydroxyalkyl or dihydroxydialkyl anilines with phosphorus pentabromide, treating the corresponding bromoalkyl or dibromodialkyl compounds so obtained with potassium cyanide, and introducing the aldehyde group by reaction with phosphorus oxychloride and N-methylformanilide and subsequent hydrolysis, that is to say by the methods of Vilsmeier and Haack (Berichte, volume 60, page 119). The diethyl ester of p-di-(carboxymethyl)-amino-benzaldehyde may be made by introducing the aldehyde group into p-di-(ethylcarboxymethyl)-aniline by the method of Vilsmeier and Haack and the free acid may be obtained by hydrolysis of the ester. The other mono- or di-(carboxyalkyl) derivatives may be made by hydrolysis of the appropriate cyanoalkyl compounds, and the esters may be made by reacting the acids with the appropriate alcohol. The mono- and di-(sulphoalkyl) derivatives may be made by the action of sodium sulphite on the corresponding chloroalkyl compounds.

The aldehyde may be converted to the corresponding anil by condensing it with aniline or a substituted aniline, for example aniline sulphonic acid and the reaction of the anil with the reactive methylene compound may be effected by heating the reagents together in methanol or other suitable medium.

As reactive methylene compounds there may be mentioned for example, cyanoacetyl compounds, for example 1 - β - octadecenylsuccinamido - 4 - omega - cyanoacetobenzene, thioindoxyls and pyrazolones, for example 1-(4'-phenoxy-3'-sulphophenyl)-3-heptadecyl-5-pyrazolone, 3-heptadecyl-5-pyrazolone and 1-(3'-carboxy-phenyl)-3-p-stearamidophenyl-5-pyrazolone.

Those dyestuffs which contain a long alkyl chain may be incorporated in the form of soluble salts into a gelatin solution and the solution may be coated in the conventional manner as a filter layer in a multilayer colour film. Owing to the presence of the long alkyl chain in the molecule, the dyestuffs do not diffuse into the adjacent sensitive layers.

The dyestuffs which do not carry substituents which render them non-diffusible may be precipitated in the gelatin in a non-diffusible form with for example a high molecular weight base, or they may be dissolved in a water-insoluble, water-permeable resin, for example polyvinyl alcohol and this solution then dispersed in the gelatin, by the process known for use in rendering colour formers non-diffusible.

The new process is especially suitable for use with a non-diffusible styryl dyestuff in the filter layer of multilayer films and paper which have 3 differently sensitised layers each containing at least 1 non-diffusible colour former wherein the uppermost layer is blue sensitive and contains a yellow colour former, and the next layer is the filter layer and one of the 2 lower layers is sensitised to red light and the other to green light, and one of the 2 lower layers contains a magenta colour former and the other contains a cyan colour former.

When such a multilayer colour film or paper containing in the filter layer, one of the said dyestuffs is exposed to the light from a coloured object or to the light transmitted by a coloured transparency, and the exposed film or paper is then colour developed with a colour-forming developer to convert the colour former to azamethine or indophenol dystuffs, and bleached, the dyestuff in the filter layer may be completely and irreversibly discharged, without any appreciable effect on the azamethine and indophenol dyestuffs forming the coloured images by treating the film or paper with an aqueous solution of an amino compound as hereinbefore defined, which solution preferably contains also a surface active agent.

The amino compound used in the process of our invention may, if desired, be added to the fixing bath, or the film or paper may be first treated with a fixing bath, for example a solution of sodium thiosulphate, and then washed before being immersed in the solution of amino compound. If desired the treatment with the amino compound can be effected at any other convenient stage in the processing subsequent to the development step.

The concentration of the amino compound solution is not critical. We have found that satisfactory results are obtained with solutions containing from 0.5 to 10% of amino compound. The free amino compound may be formed in situ by adding alkali to a salt of the amino compound, but we prefer to use a pre-formed free amino compound, or hydrated form thereof, for example an aqueous solution of ethylene diamine or 4-sulphophenylhydrazine or an aqueous solution of hydrazine hydrate.

The surface active agent which we prefer to add to the solution of the amino compound appears to assist in removing from the film or paper at least some of the decomposition products of the filter dyestuff. As surface active agent there may be used for example, the condensation products of phenols or alkylphenols with ethylene oxide, the condensation products of aliphatic alcohols, for example cetyl-alcohol with ethylene oxide, alkylated sulphonated aromatic petrol fractions or quaternary ammonium salts containing long alkyl chains such as for example cetyltrimethyl-ammonium bromide.

The concentration of surface active agent is not critical but we have found that concentrations of between 0.01% and 2% give satisfactory results.

After treatment with the amino compound and preferably after a subsequent treatment with a dilute alkali, for example dilute sodium carbonate solution, the film or paper may be washed and dried and the film or paper so obtained contains no yellow dyestuff in the filter layer, but the azamethine or indophenol dyestuffs forming the colour images have not been appreciably affected by the treatment with the amino compound. The yellow filter dyestuff is not appreciably re-formed on standing or heating.

The invention is illustrated but not limited by the following examples in which the parts are by weight:

*Example 1*

A multilayer light sensitive photographic film is made up as follows:

A support material is coated with a layer of red sensitive emulsion containing 10 grams per litre of the sodium salt of 1 - hydroxy - 2 - naphthoylamino - 2' - (methyloctadecylamino) - benzene - 5' - sulphonic acid. Upon this layer there is coated a green sensitive emulsion containing 10 grams per litre of the sodium salt of the magenta colour former-1-(4'-phenoxy-3'-sulphophenyl)-3-heptadecyl-5-pyrazolone. A solution of 25 grams of the sodium salt of 1 - (4' - phenoxy - 3' - sulphophenyl) - 3 - heptadecyl - 4 - (p - N - methyl - N - β - sulphoethyl-aminobenzylidene)-5-pyrazolone per litre of gelatin is now coated on to form a yellow filter layer and finally a layer of blue sensitive emulsion containing 10 grams per litre of the colour forming component described in Example 3 of British specification No. 486,848.

The film is exposed to light and developed in a solution of the following composition:

| | Parts |
|---|---|
| p-N:N-diethylaminoaniline hydrochloride | 3 |
| Sodium sulphite anhydrous | 1 |
| Sodium carbonate anhydrous | 60 |
| Potassium bromide | 2 |

Water to make up to 1,000 parts.

The film is rinsed with water and then immersed in the following stop bath:

Potassium dihydrogen phosphate, 60 parts.
Water to make up to 1,000 parts.

The film is washed and treated with the following silver bleach solution:

| | Parts |
|---|---|
| Potassium ferricyanide | 100 |
| Potassium bromide | 25 |

Water to make up to 1,000 parts.

The film is washed, fixed with a 20% aqueous solution of sodium thiosulphate, washed again and immersed in a 3% aqueous solution of hydrazine hydrate containing 0.5% of a condensation product of an alkylphenol with about 10 molecular proportions of ethylene oxide.

The film is finally washed and dried.

In place of the aqueous solution of hydrazine hydrate used in the above example there may be used a 5% aqueous solution of ethylene diamine or a solution obtained by adding 5 parts of ammonia solution (density 0.380) to 100 parts of a 5% aqueous solution of hydroxylamine hydrochloride.

Example 2

A multilayer film is made up as described in Example 1 and exposed to light from a coloured object. It is then colour developed, stopped and bleached as described in Example 1. The film is fixed and the filter dyestuff is discharged by treating the film in the following solution:

| | Parts |
|---|---|
| Sodium thiosulphate | 200 |
| Hydrazine hydrate | 50 |

Water to make up to 1,000 parts.

The film is finally washed and dried.

Example 3

A multilayer light sensitive photographic film is made up as described in Example 1, except that a solution of 20 grams of the sodium salt of 1-β-octadecenylsuccinamido - 4 - omega - (p - β:β' - di-(carboxyethyl)-aminobenzylidene)-omega-cyanoacetobenzene per litre of gelatin is coated to form the filter layer instead of the solution of 25 grams of the sodium salt of 1-(4'-phenoxy-3'-sulphophenyl) - 3 - heptadecyl-4-(p-N-methyl-N-β-sulphoethyl-aminobenzylidene)-5-pyrazolone per litre of gelatin solution. The material is then exposed, colour developed, stopped, bleached and fixed as described in Example 1.

The filter dyestuff is discharged by the following treatment.

The material is immersed in a solution of the following composition:

| | Parts |
|---|---|
| Sodium thiosulphate | 200 |
| Hydrazine hydrate | 50 |

Water to make up to 1,000 parts.

The film is rinsed with water and immersed in a 5% aqueous solution of sodium carbonate. The film is then finally washed and dried.

It will be appreciated from the foregoing description that the photographic materials with which the present invention is concerned are those in which the color sensitive emulsion layer or layers are of the color sensitized silver halide emulsion type.

What we claim is:

1. A process for the production of colored, photographic elements from photographic material comprised of a base having at least one silver halide emulsion layer thereon and containing a color former capable of coupling with the oxidation product of a primary aromatic amino developing agent to form a dyestuff selected from the group consisting of azomethine and indophenol dyestuffs and a filter layer containing a yellow, non-diffusible styryl dyestuff, said styryl dyestuff being obtainable by condensation of an anil of a substituted benzaldehyde with a reactive methylene compound, in light absorbing relationship therewith, said process comprising the steps of exposing said photographic material to light, color developing with said color forming developer to convert said color former to said dyestuff, bleaching and thereafter discharging the styryl filter dyestuff without discharging the color developed dyestuff by treating the exposed and color developed photographic material with an aqueous solution of an amino compound selected from the group consisting of hydrazine, 4-sulfophenylhydrazine, hydroxylamine, and ethylene diamine.

2. The process of claim 1 wherein the aqueous solution of the amino compound also contains a surface active agent.

3. A process for the production of colored, photographic elements from photographic material comprised of a base having at least one silver halide emulsion layer thereon and containing a color former capable of coupling with the oxidation product of a primary aromatic amino developing agent to form a dyestuff and a filter layer in light absorbing relationship with said emulsion layer and containing a yellow, non-diffusible styryl dyestuff, said styryl dyestuff being obtainable by condensation of an anil of a substituted benzaldehyde, said substituent being selected from the group consisting of alkoxy groups and amino groups, with a reactive methylene compound, said process comprising the steps of exposing said photographic material to light, color developing with a color forming developer, whereby the color former in the exposed parts of the layers is converted to colored images, bleaching and thereafter discharging the styryl filter dyestuff without discharging the color developed dyestuff by treating the exposed and color developed photographic material with an aqueous solution of an amino compound selected from the group consisting of hydrazine, 4-sulfophenylhydrazine, hydroxylamine, and ethylene diamine.

4. Process according to claim 3 wherein the aqueous solution of the amino compound contains also a surface active agent.

5. Process according to claim 3 wherein the photographic material is treated with a dilute alkali after the treatment with an aqueous solution of an amino compound.

6. A process according to claim 3, wherein said styryl dyestuff is the sodium salt of 1-β-octadecenylsuccinamido-4-omega-(p-β,β'-di - (carboxyethyl)aminobenzylidene) - omega-cyano-acetobenzene.

References Cited in the file of this patent

UNITED STATES PATENTS

| 2,538,009 | Keyes et al. | Jan. 16, 1951 |
|---|---|---|
| 2,574,243 | Collins et al. | Nov. 6, 1951 |

FOREIGN PATENTS

| 550,028 | Great Britain | Dec. 18, 1942 |